(12) United States Patent
Yi

(10) Patent No.: US 11,182,922 B2
(45) Date of Patent: Nov. 23, 2021

(54) AI APPARATUS AND METHOD FOR DETERMINING LOCATION OF USER

(71) Applicant: LG ELECTRONICS INC., Seoul (KR)

(72) Inventor: Sihyuk Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 16/488,307

(22) PCT Filed: Jun. 5, 2019

(86) PCT No.: PCT/KR2019/006818
§ 371 (c)(1),
(2) Date: Aug. 23, 2019

(87) PCT Pub. No.: WO2020/246640
PCT Pub. Date: Dec. 10, 2020

(65) Prior Publication Data
US 2021/0174534 A1 Jun. 10, 2021

(51) Int. Cl.
*G06K 9/00* (2006.01)
*G06T 7/70* (2017.01)
(Continued)

(52) U.S. Cl.
CPC ............ *G06T 7/70* (2017.01); *G06K 9/00604* (2013.01); *G06N 20/00* (2019.01); *G10L 15/22* (2013.01);
(Continued)

(58) Field of Classification Search
CPC ............ G06T 7/70; G06T 2207/30244; G06T 2207/30196; G10L 15/22; G10L 15/24; G10L 25/51; G06N 20/00; G06K 9/00604
(Continued)

(56) References Cited

U.S. PATENT DOCUMENTS

| 9,710,753 B1 | 7/2017 | Shams et al. |
| 10,083,006 B1 | 9/2018 | Feuz et al. |

(Continued)

FOREIGN PATENT DOCUMENTS

| JP | 2009-194857 A | 8/2009 |
| KR | 10-2018-0125241 A1 | 11/2018 |
| KR | 10-2019-0024190 A | 3/2019 |

*Primary Examiner* — Charlotte M Baker
(74) *Attorney, Agent, or Firm* — Birch, Stewart, Kolasch & Birch, LLP

(57) ABSTRACT

Provided is an AI apparatus for determining a location of a user including: a communication unit configured to communicate with at least one external AI apparatus obtaining first image data and first sound data; a memory configured to store location information on the at least one external AI apparatus and the AI apparatus; a camera configured to obtain second image data; a microphone configured to obtain second sound data; and a processor configured to: generate first recognition information on the user based on the second image data; generate second recognition information on the user based on the second sound data; obtain, from the at least one external AI apparatus, third recognition information on the user generated based on the first image data and fourth recognition information on the user generated based on the first sound data; determine the user's location based on the location information, the first recognition information, and the third recognition information; and calibrate the determined user's location based on the second recognition information and the fourth recognition information.

11 Claims, 15 Drawing Sheets

(51) Int. Cl.
*G06N 20/00* (2019.01)
*G10L 15/22* (2006.01)
*G10L 15/24* (2013.01)
*G10L 25/51* (2013.01)

(52) U.S. Cl.
CPC .............. *G10L 15/24* (2013.01); *G10L 25/51* (2013.01); *G06T 2207/30196* (2013.01); *G06T 2207/30244* (2013.01)

(58) Field of Classification Search
USPC ........................................................ 382/103
See application file for complete search history.

(56) References Cited

U.S. PATENT DOCUMENTS

| | | | |
|---|---|---|---|
| 10,547,937 B2 * | 1/2020 | Abrams | G10L 21/028 |
| 10,803,458 B1 * | 10/2020 | Vokes | G06Q 20/4012 |
| 2016/0373269 A1 | 12/2016 | Okubo et al. | |
| 2018/0233145 A1 | 8/2018 | Bathiche et al. | |
| 2019/0237078 A1 | 8/2019 | Park | |
| 2020/0094398 A1 * | 3/2020 | Young | B25J 11/008 |
| 2020/0117900 A1 * | 4/2020 | Deng | H04W 4/02 |

\* cited by examiner

FIG. 9
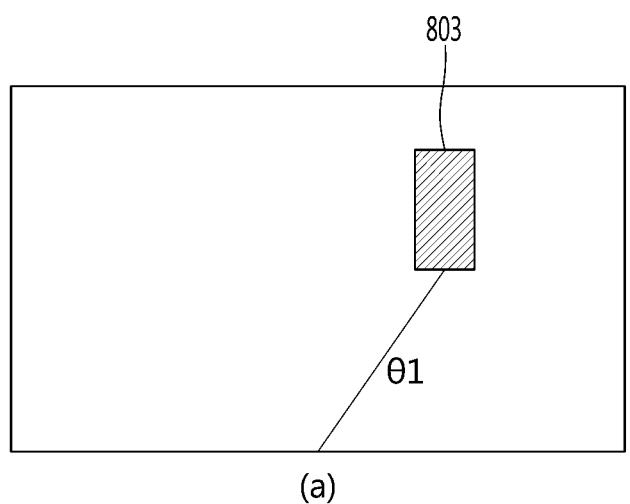
(a)
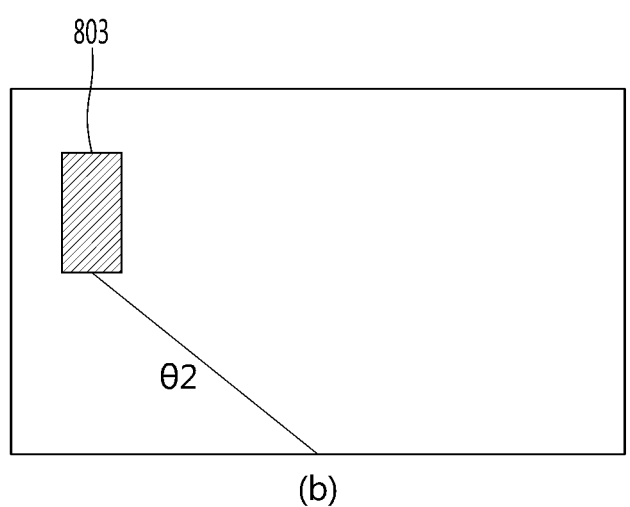
(b)

FIG. 11
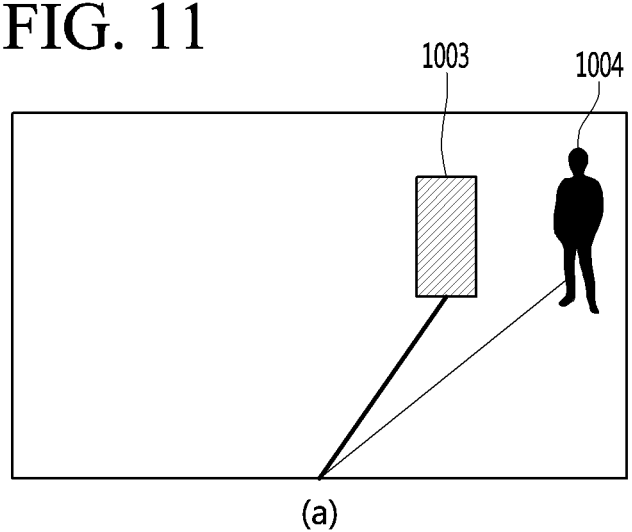
(a)
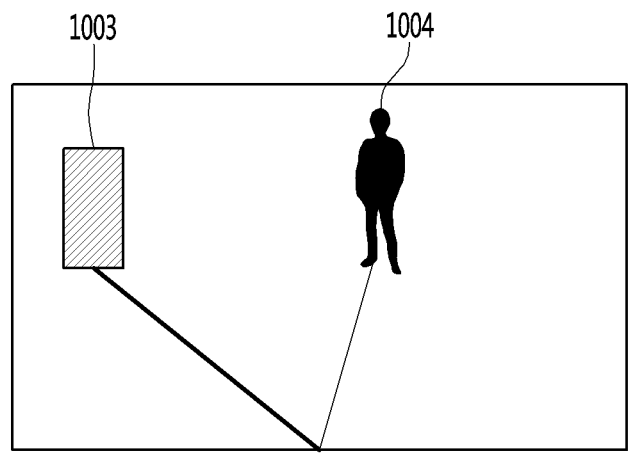
(b)
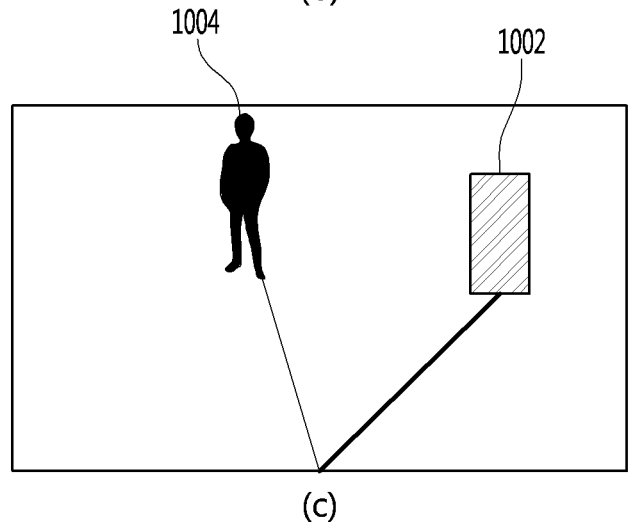
(c)

AI APPARATUS AND METHOD FOR DETERMINING LOCATION OF USER

CROSS REFERENCE TO RELATED APPLICATIONS

This application is the National Phase of PCT/KR2019/006818 filed on Jun. 5, 2019, which is hereby expressly incorporated by reference into the present application.

BACKGROUND

1. Field

The present invention relates to an AI apparatus and a method for determining a location of a user. Specifically, the present invention relates to an AI apparatus and a method for determining a location of a user using image information and sound information in an environment in which a plurality of terminals or AI apparatuses are installed.

2. Related Art

Recently, services to which a voice recognition technology such as an artificial intelligent speaker, a voice control, a voice secretary, or the like are increasing. It is important to accurately identify an intention of a user from utterance of the user, and the intention of the user is often influenced by a location of the user. Therefore, when the user's location may also be accurately identified indoors, the intention of the user may be identified more accurately.

A purpose of a conventional technology of identifying the location of the user is, when the user is carrying a wearable device or a terminal, to identify a location of the device held by the user. In this case, it is difficult to identify the location of the user when the user does not carry the terminal.

SUMMARY

A purpose of the present invention is to provide an AI apparatus and a method for determining a user's location using a plurality of AI apparatuses respectively having a camera and a microphone.

Further, another purpose of the present invention is to provide an AI apparatus and a method that, even when a user gives an utterance without clearly specifying a target object, identify a meaning or an intention of the utterance more accurately based on a location of the user.

One embodiment of the present invention provides an AI apparatus and a method that generate first recognition information based on image data for a user, generate second recognition information based on sound data for the user, obtain third recognition information generated based on image data from at least one external AI apparatus and fourth recognition information generated based on sound data, and determine a user location using location information of at least one AI apparatus and the obtained first to fourth recognition information.

Further, an embodiment of the present invention provides an AI apparatus and a method that determine a location of a user when a control voice is acquired from the user and determine a target object corresponding to the control voice using the determined user location.

According to various embodiments of the present invention, even when the user does not carry a wearable device or a terminal, the user's location may be determined by only the plurality of AI apparatuses constituting one AI system.

Further, according to various embodiments of the present invention, as the new AI apparatus is added to the AI system, a range in which the user's location may be determined may be broadened, thereby determining the user's location with a higher accuracy.

Further, according to various embodiments of the present invention, even when the user gives the utterance without clearly specifying the target object, the utterance intention of the user may be more accurately determined based on the location of the user.

BRIEF DESCRIPTION OF DRAWINGS

FIGS. 8 and 9 are views illustrating a method for acquiring location information of an AI apparatus 100 according to an embodiment of the present invention.

FIGS. 10 and 11 are views illustrating a method for generating image recognition information of a user according to an embodiment of the present invention.

DETAILED DESCRIPTIONS

Figure 1:
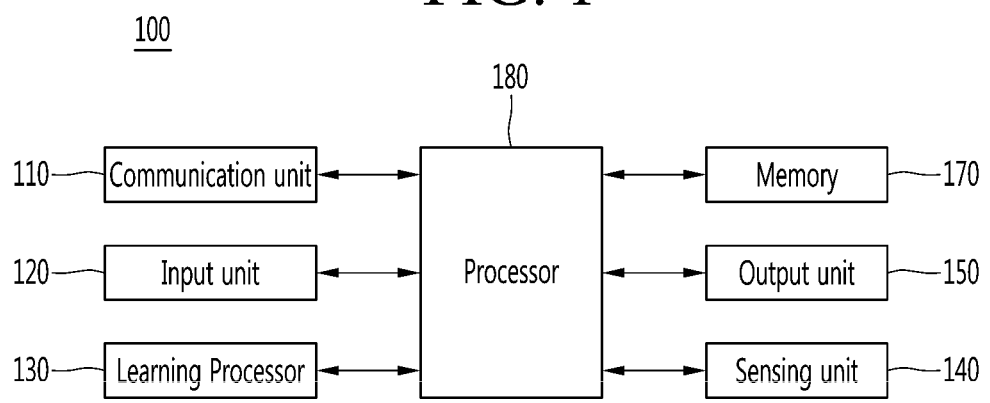
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
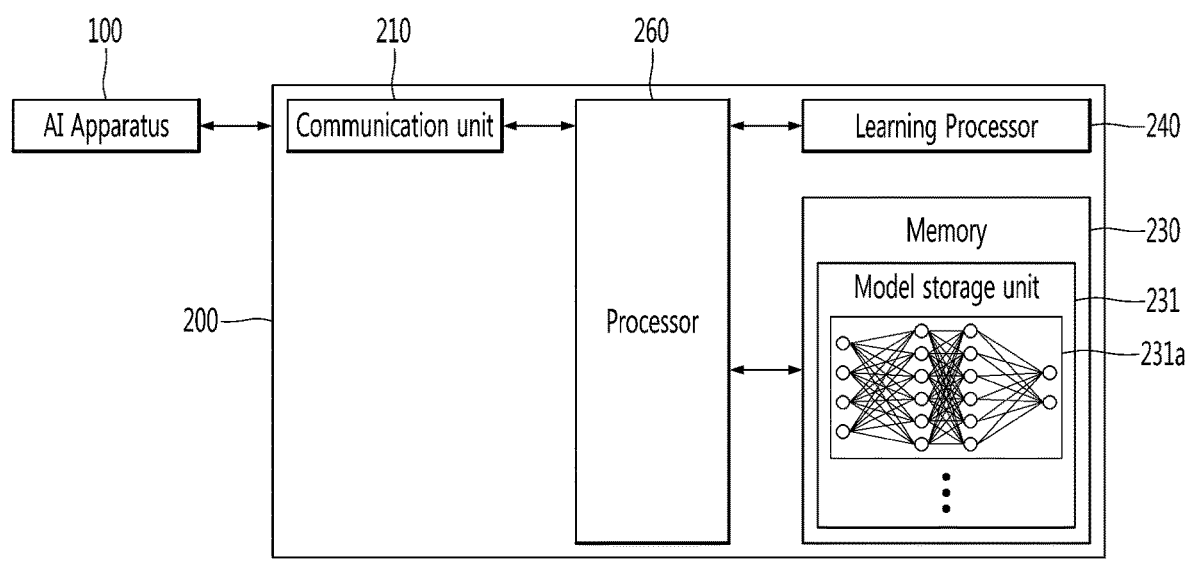
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
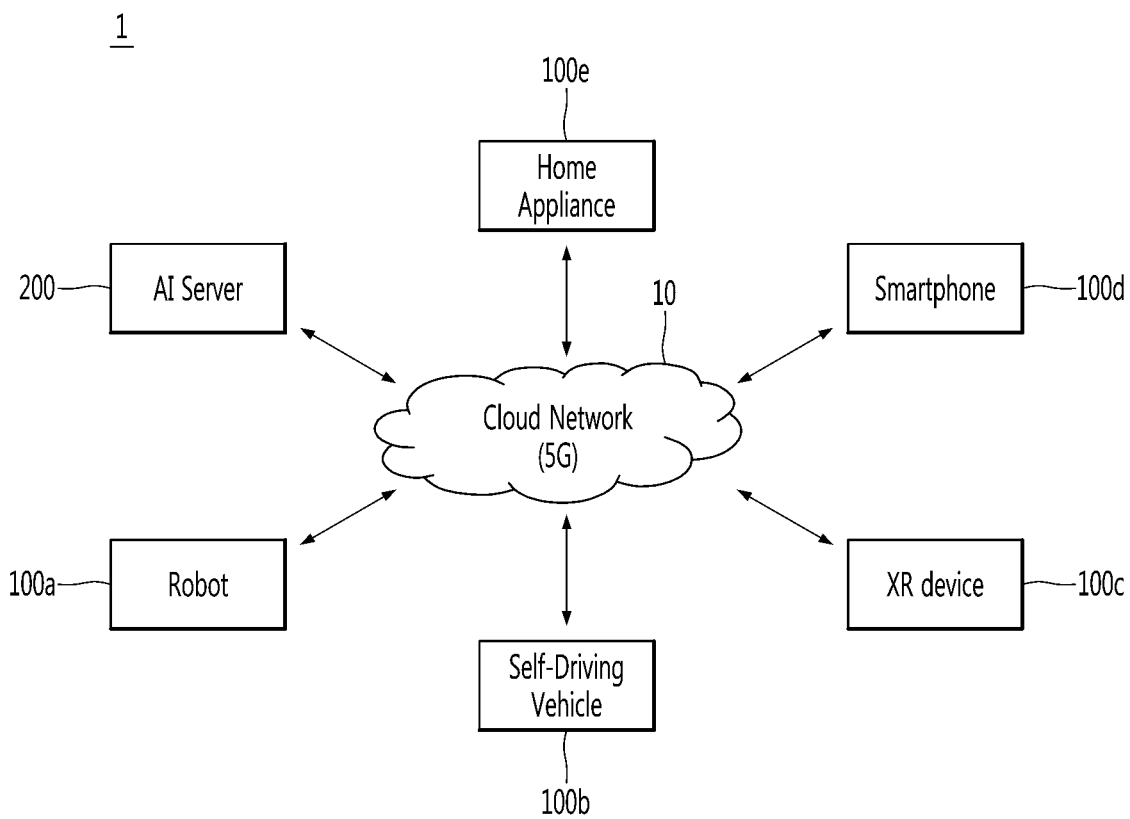
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
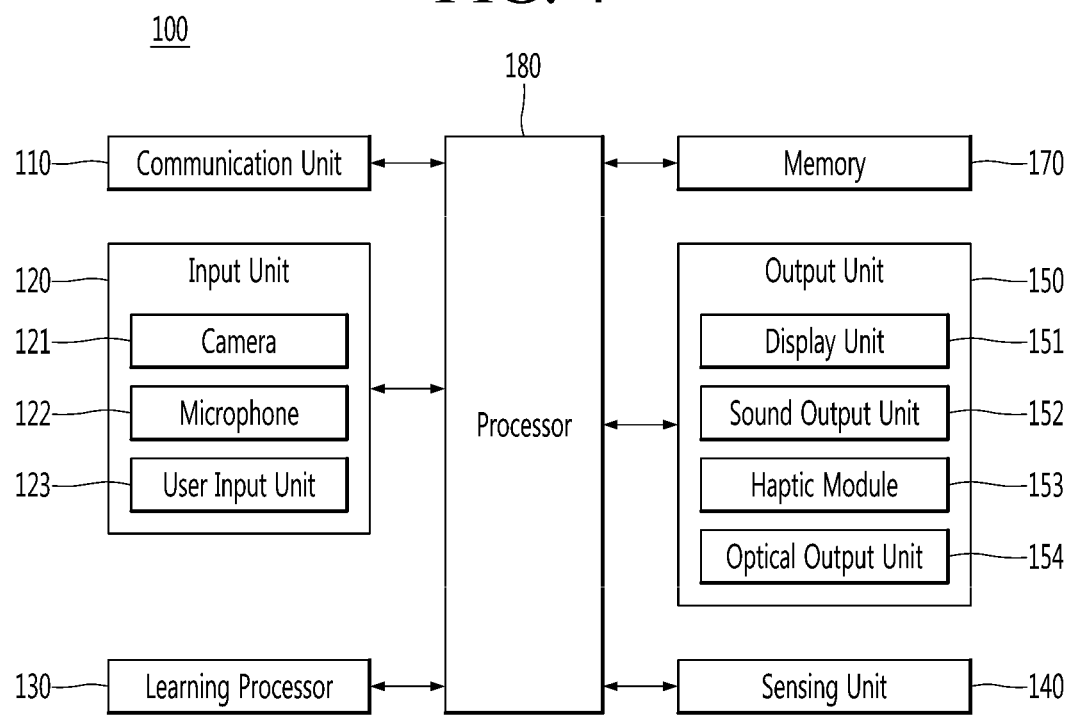
FIG. 4 is a block diagram illustrating an AI apparatus according to an embodiment of the present invention.

FIG. 4 is a block diagram illustrating an AI apparatus 100 according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
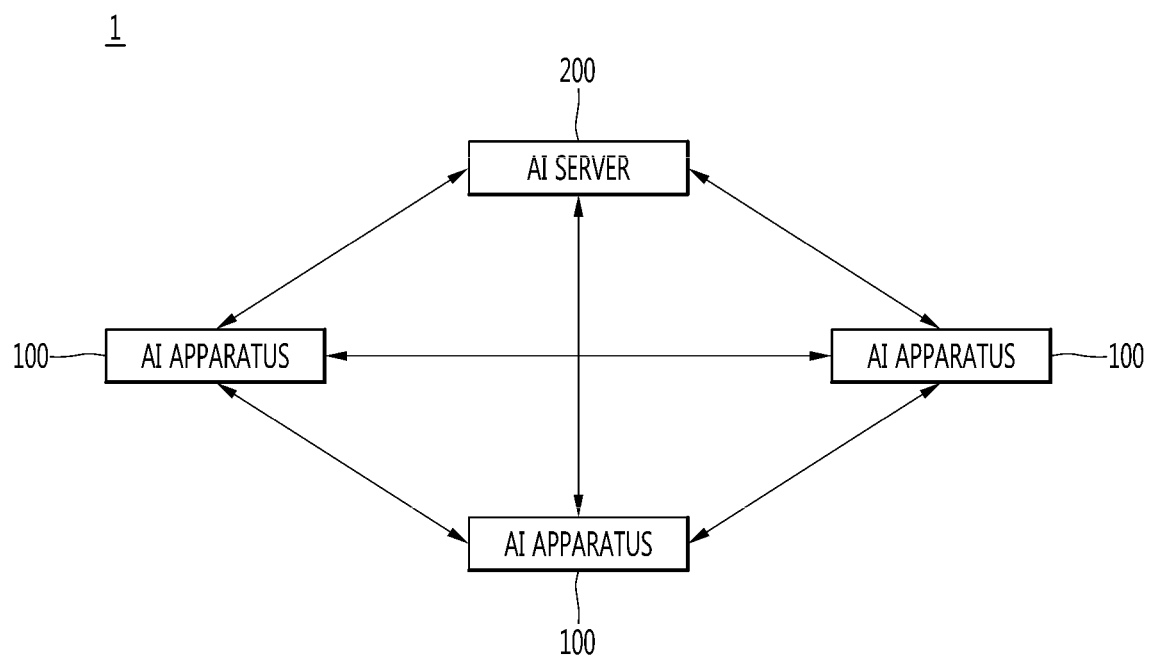
FIG. 5 is a view illustrating an AI system according to an embodiment of the present invention.

FIG. 5 is a view illustrating the AI system 1 according to an embodiment of the present invention.

Referring to FIG. 5, the AI system 1 for determining a location of the user according to one embodiment of the present invention may include at least one of the AI apparatus 100 or the AI server 200.

The at least one of the AI apparatus 100 or the AI server 200 may communicate with each other using a wired or wireless communication technology.

Here, the apparatuses 100 and 200 may communicate with each other via a base station, a router, or the like, but may directly communicate with each other using a short-range communication technique or the like.

For example, the apparatuses 100 and 200 may communicate with each other via the base station or directly using 5G (5th generation) communication.

In one embodiment, the AI server 200 may obtain data to be used to determine the location of the user from the AI apparatus 100 and determine the location of the user based on the collected data.

In one embodiment, one AI apparatus 100 may obtain data to be used to determine the location of the user from another AI apparatus 100, and may determine the location of the user based on the data collected by itself and the acquired data.

Figure 6:
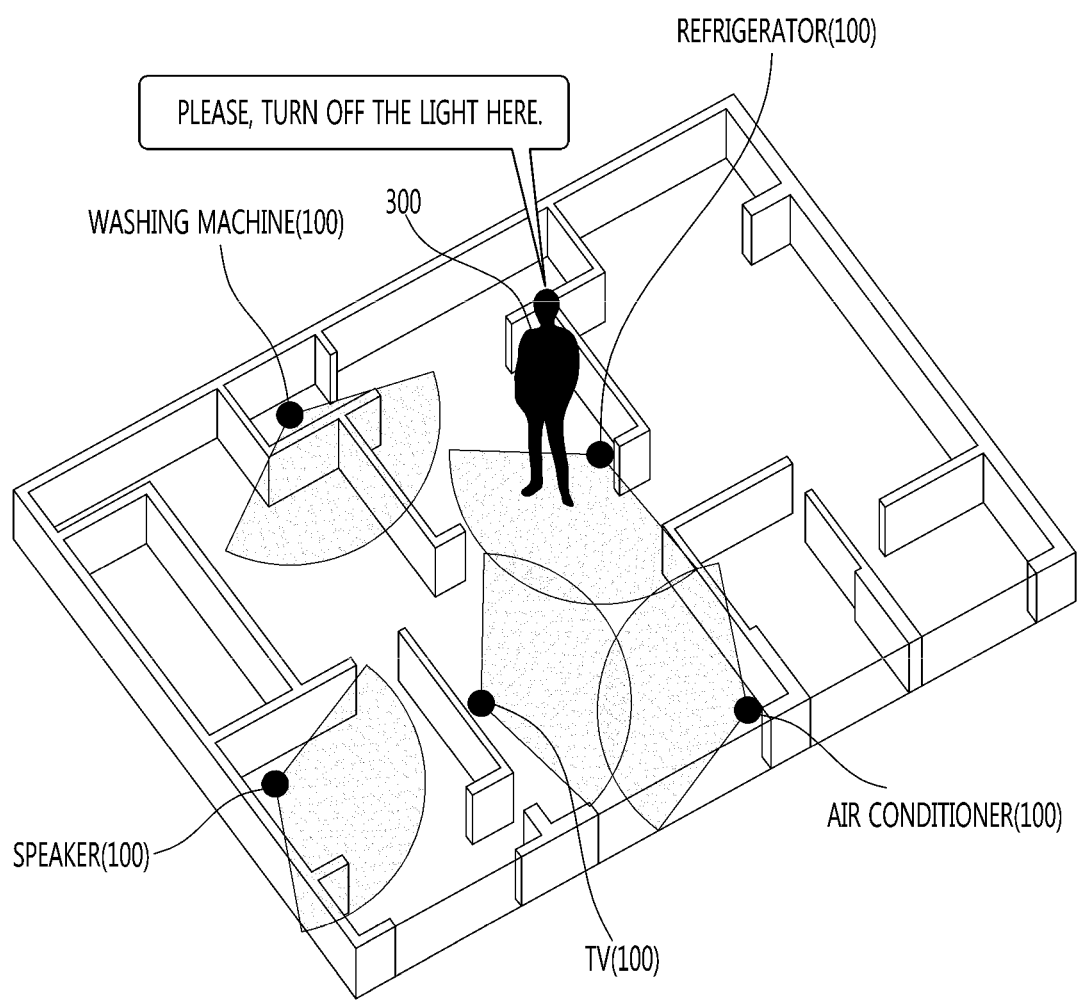
FIG. 6 is a view illustrating an AI system according to an embodiment of the present invention.

FIG. 6 is a view illustrating the AI system 1 according to an embodiment of the present invention.

Referring to FIG. 6, the AI system 1 for determining the location of the user according to one embodiment of the present invention may be composed of a plurality of AI apparatuses 100.

For example, the AI system 1 may include a washing machine, a refrigerator, a speaker, a TV, an air conditioner, and the like as the AI apparatuses 100.

Each AI apparatus 100 includes the camera 121 to acquire image data of a user 300 and the microphone 122 to acquire sound data of the user 300.

In each AI apparatus 100, a field of view of the camera 121 is limited, and thus an area to be captured is also limited.

As described in FIG. 6, the user 300 may attempt to interact at arbitrary location without specifying an exact target object. In this case, an intention of the user may be more accurately analyzed by identifying a location of the user 300.

For example, when the user 300 does not explicitly specify the target object in a kitchen, such as 'Please, turn off the light here.', the AI apparatuses 100 may determine the location of the user 300 to be the kitchen and identify that the intention of the user is to turn off a lamp installed in the 'kitchen'.

Each AI apparatus 100 may acquire image data of the user 300 via the camera 121 and generate recognition information from the acquired image data.

Similarly, each AI apparatus 100 may acquire sound data of the user 300 via the microphone 122 and generate the recognition information from the acquired sound data.

The recognition information may include user identification information, user location information, and the like when the user 300 is recognized in the image data.

Figure 7:
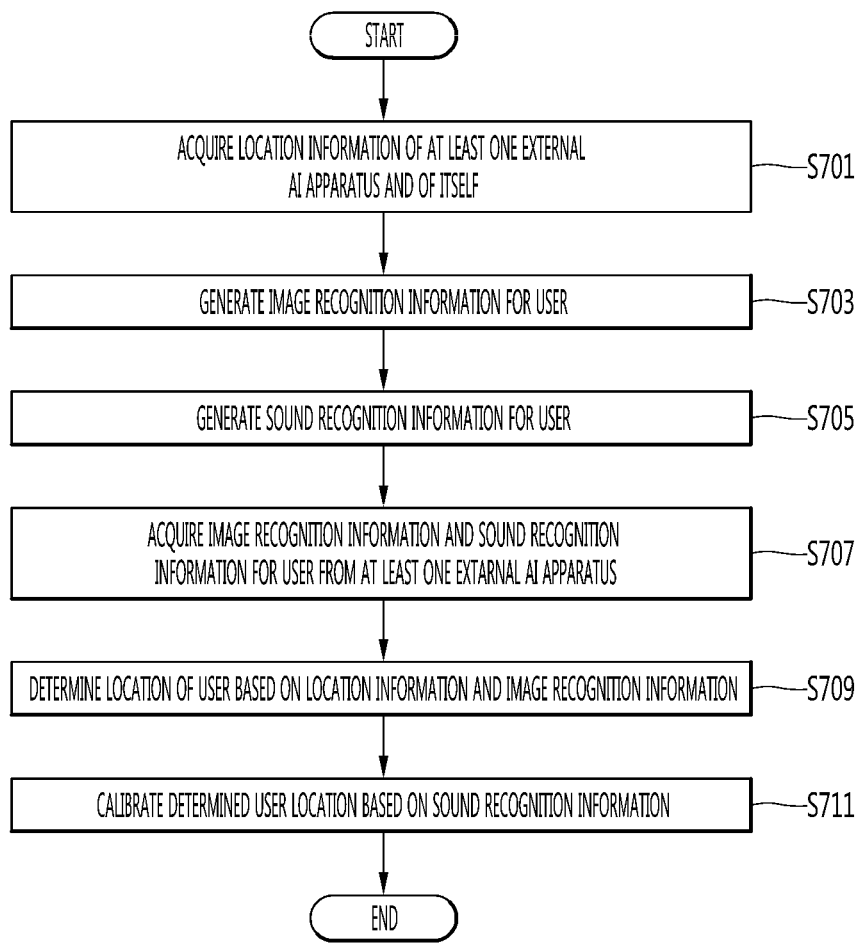
FIG. 7 is a flowchart illustrating a method for determining a location of a user by an AI apparatus 100 according to an embodiment of the present invention.

FIG. 7 is a flowchart illustrating a method for determining a location of a user by the AI apparatus 100 according to an embodiment of the present invention.

Referring to FIG. 7, the processor 180 of the AI apparatus 100 acquires location information of at least one external AI apparatus 100 and of the AI apparatus 100 itself (S701).

The AI apparatuses 100 constitute one AI system 1. Further, an apparatus registration process may be performed in each AI apparatus 100 to constitute one AI system 1.

The apparatus registration process is a process of adding the AI apparatus 100 to the AI system 1. Location information of a new AI apparatus 100 may be determined using the already registered AI apparatus 100.

Here, when the new AI apparatus 100 is registered in the AI system 1, each AI apparatus 100 may acquire image data of the new AI apparatus 100 via the camera and generate the location information of the new AI apparatus 100 using the acquired image data.

Alternatively, the location information of the new AI apparatus 100 may be determined by user's input.

The generated location information may be shared among the AI apparatuses 100.

The location information of the AI apparatus 100 may include distance information between the AI apparatuses 100, relative location information between the AI apparatuses 100, camera direction information of each AI apparatus 100, absolute location information of each AI apparatus 100 in a space of the AI system 1, and the like.

The absolute location information in the space of the AI system 1 may refer to a location in map data corresponding to the space of the AI system 1.

Here, the map data may be generated using a SLAM (Simultaneous Localization And Mapping) technology.

For example, a robot cleaner among the AI apparatuses 100 may generate the map data while traveling in the space of the AI system 1, the generated map data may be shared with other AI apparatuses 100.

Accordingly, the AI apparatus 100 identifies a relative location of another AI apparatus 100, which constitutes one AI system 1 together, or identifies an absolute location of said another AI apparatus 100 in the space.

Then, the processor 180 of the AI apparatus 100 generates image recognition information of the user (S703).

The processor 180 may acquire the image data of the user via the camera 121 and generate the image recognition information of the user based on the acquired image data.

The image recognition information of the user includes direction information of the user with respect to the AI apparatus 100.

The processor 180 may recognize the user in the image data using a user recognition model learned by the machine learning algorithm or the deep learning algorithm and generate the image recognition information including the direction information of the recognized user.

The processor 180 may extract user identification features for identifying the user and generate the identification information of the user based on the extracted features.

The processor 180 may recognize an attitude or an action of the user to generate behavior information of the user. Here, when the user is performing an action of pointing a specific object, the behavior information of the user may include information indicating a direction pointed by the user, information indicating recognition information of the object located in the direction pointed by the user, and the like.

The processor 180 may recognize directions of a head and eyes of the user to generate gaze information of the user.

The image recognition information may include at least one of the identification information, behavior information, or gaze information of the user.

A method for acquiring the direction information of the user with respect to the AI apparatus 100 will be described below.

Then, the processor 180 of the AI apparatus 100 generates sound recognition information of the user (S705).

The processor 180 may obtain the sound data of the user via the microphone 122 and may generate the sound recognition information of the user based on the acquired sound data.

The sound data may include a user's voice.

The sound recognition information of the user includes direction information of the user with respect to the AI apparatus 100.

For example, the processor 180 may generate the direction information of the user with respect to the AI apparatus 100 using a signal delay between the plurality of microphones 122.

Here, the processor 180 may acquire volume data of the sound data, and may further use the acquired volume data to generate the sound recognition information of the user. Here, the sound recognition information may include the acquired sound volume itself or may include distance information to the user inferred by an intensity of the sound.

When the distance to the user is determined using the volume data, many errors and distortions may exist. This is because a volume of a sound transmitted may vary greatly depending on a structure of a space, an obstacle, or a material of a surrounding object. Therefore, the processor 180 may set a priority or a weight of the volume data low and use the volume data subsidiarily.

Then, the processor 180 of the AI apparatus 100 acquires the image recognition information and the sound recognition information of the user from the at least one external AI apparatus (S707).

Each external AI apparatus 100 may generate the image recognition information and the sound recognition information of the user in the same manner as in S703 and S705 and may transmit the generated image recognition information and the generated sound recognition information to the AI apparatus 100.

Then, the processor 180 of the AI apparatus 100 determines the location of the user based on the location information of the AI apparatuses 100 and the image recognition information of the user (S709).

Since the processor 180 identifies the location information of each AI apparatus 100, the location of the user may be specified using the image recognition information acquired from each AI apparatus 100.

For example, the processor 180 may obtain an angle between each two of the AI apparatuses 100 and an angle between each AI apparatus 100 and the user using the direction information of the user with respect to each AI apparatus 100 and the camera direction information of each AI apparatus 100. Further, the processor 180 may determine the location of the user further using the distance information between the AI apparatuses 100.

Here, the processor 180 may assign a higher priority to image recognition information acquired from a fixed AI apparatus that has not moved for a predetermined time than image recognition information acquired from a non-fixed AI apparatus. Further, the processor 180 may assign a higher weight to image recognition information with a higher priority to determine the location of the user.

Here, the processor 180 may determine the location of the user by geometrically calculating the location of the user using each distance between the AI apparatuses 100 and each direction information of the user 300 with respect to each AI apparatus 100. Alternatively, the processor 180 may determine the location of the user using a first location determination model that is learned by a machine learning algorithm or a deep learning algorithm.

Here, the first location determination model may be configured as an artificial neural network.

For example, when the location information of each AI apparatus 100 and image-based user direction information from each AI apparatus 100 are input as input features, the first location determination model may output the location of the user.

Then, the processor 180 of the AI apparatus 100 calibrates the determined user location based on the sound recognition information of the user (S711).

Since the processor 180 identifies the location information of each AI apparatus 100, the location of the user may be specified using the sound recognition information acquired by each AI apparatus 100, similarly to a case of determining the location of the user based on the image recognition information of the user.

Since the direction information of the user is included in the sound recognition information, the location of the user may be determined by collecting the directions of the user respectively determined by the AI apparatuses 100.

When the sound recognition information includes the volume data of the sound data or the distance information to the user generated based on the volume data, the volume data or the distance information determined by each AI apparatus 100 may be used to determine the location of the user.

Here, the processor 180 may determine the location of the user using a second location determination model that is learned by a machine learning algorithm or a deep learning algorithm. The second location determination model is a model that determines the location of the user from the sound data, and is different from the first location determination model that determines the location using the image data.

Here, the second location determination model may be configured as an artificial neural network.

For example, when the location information of each AI apparatus 100 and sound-based user direction information from each AI apparatus 100 are input as input features, the second location determination model may output the location of the user.

Alternatively, when the location information of each AI apparatus 100 and the sound volume information from each AI apparatus 100 are input as input features, the second location determination model may output the location of the user.

When the sound volume information is used, a volume of the sound differs depending on the surrounding object or the structure of the space even when a distance from the sound is the same. Therefore, when the sound volume information is used, an accuracy of estimating the distance from each AI apparatus 100 based on the sound volume may be greatly reduced. Therefore, the second location determination model may be learned an environment of the AI system 1 using the machine learning algorithm or deep learning algorithm to improve the accuracy.

Here, the processor 180 may assign a higher priority to sound recognition information acquired from a fixed AI apparatus that has not moved for a predetermined time than sound recognition information acquired from a non-fixed AI apparatus. Further, the processor 180 may assign a higher weight to sound recognition information with a higher priority to calibrate the location of the user.

In determining the location of the user, calibrating the determined user location using the sound recognition information acquired from the sound data after determining the user location using the image recognition information acquired from the image data may mean that the image data has a higher priority than the sound data.

Accordingly, the AI apparatuses 100 may share the positioning information generated via the camera 121 and the microphone 122 with each other, thereby identifying the user location that could not be identified by only one AI apparatus 100. Further, as the number of the AI apparatuses 100 constituting one artificial intelligence system 1 increases, a range in which the location of the user may be identified increases, thereby improving the accuracy of the determined location.

Figure 8:
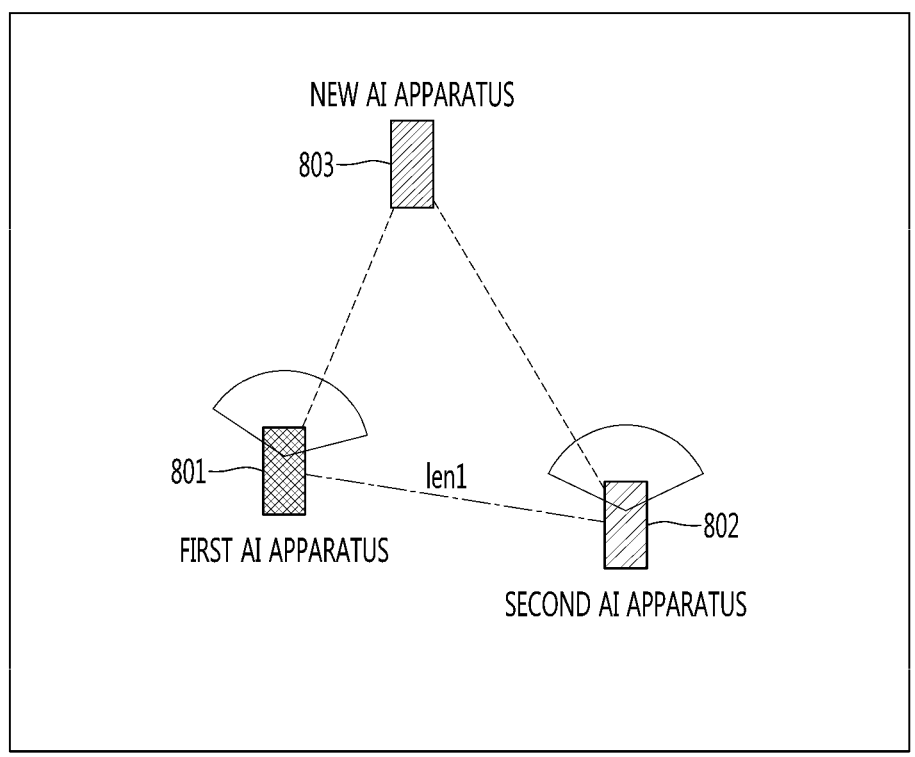

FIGS. 8 and 9 are views illustrating a method for acquiring location information of the AI apparatus 100 according to an embodiment of the present invention.

Specifically, FIG. 8 illustrates a situation where a new AI apparatus 803 has to be registered in the AI system 1 in which a first AI apparatus 801 and a second AI apparatus 802 are already registered. Further, FIG. 9 illustrates image data ((a) in FIG. 9) and image data ((b) in FIG. 9) respectively obtained from the first AI apparatus 801 and the second AI apparatus 802 registered in the AI system 1.

Here, when the first AI apparatus 801 and the second AI apparatus 802 are registered in the AI system 1, distance information between the first AI apparatus 801 and the second AI apparatus 802 and camera direction information of each of the first AI apparatus 801 and the second AI apparatus 802 may be obtained.

The first AI apparatus 801 may recognize the new AI apparatus 803 contained in the acquired image data and determine a direction of the recognized new AI apparatus 803 with respect to the first AI apparatus 801.

Here, the direction of the new AI apparatus 803 with respect to the first AI apparatus 801 may be represented as a relative direction θ1 with respect to the camera direction of the first AI apparatus 801. Further, an absolute direction of the new AI apparatus 803 with respect to the first AI apparatus 801 may be identified using such relative direction information and camera direction information.

The second AI apparatus 802 may recognize the new AI apparatus 803 contained in the acquired image data and determine a direction of the recognized new AI apparatus 803 with respect to the second AI apparatus 802.

Here, the direction of the new AI apparatus 803 with respect to the second AI apparatus 802 may be represented as a direction θ2 with respect to the camera direction of the second AI apparatus 802. Further, an absolute direction of the new AI apparatus 803 with respect to the second AI apparatus 802 may be identified using such relative direction information and camera direction information.

Since the AI apparatuses 801 and 802 already registered respectively acquire direction information of the new AI apparatus 803 and know the distance information between the AI apparatuses 801 and 802, distances between the AI apparatuses 801, 802, and 803 and directions of the respective AI apparatuses 801, 802, and 803 may be identified. Further, a location of the new AI apparatus 803 inside the AI system 1 may be identified.

FIGS. 8 and 9 illustrate the method for identifying the location of the new AI apparatus 803 using the AI apparatuses 801 and 802 that are already registered. However, the present invention may use the same method to determine the location of the user using the AI apparatuses 801 and 802.

Figure 10:
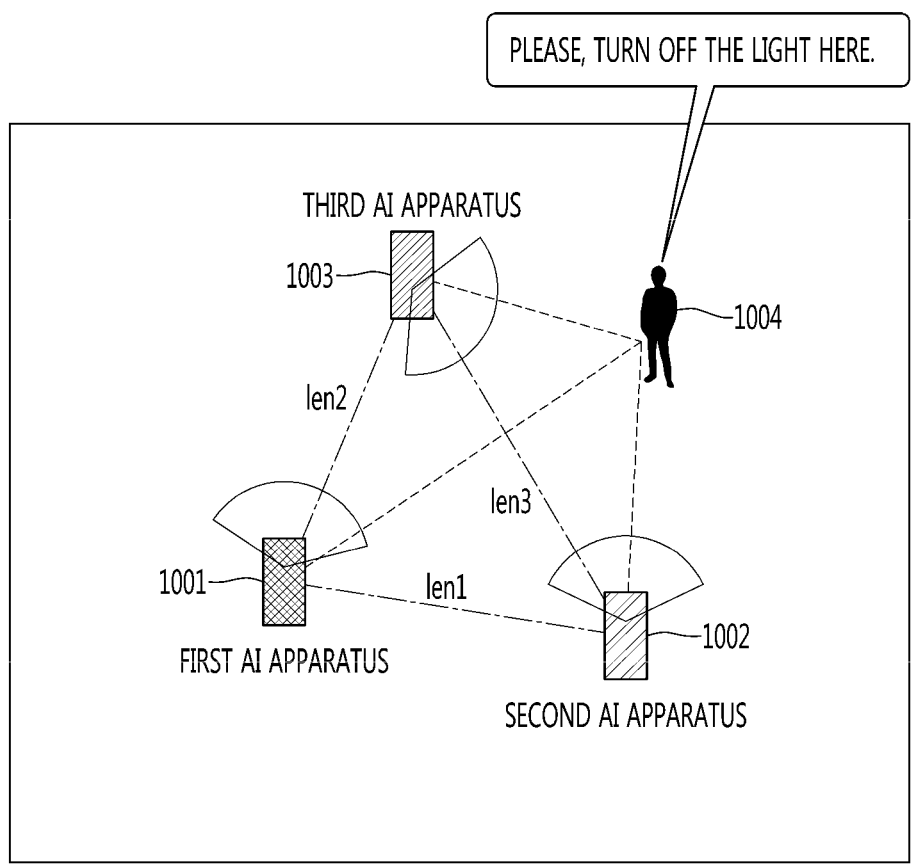

FIGS. 10 and 11 are views illustrating a method for generating image recognition information of a user according to an embodiment of the present invention.

Specifically, FIG. 10 illustrates a situation of determining a location of a user 1004 in a state in which a first AI apparatus 1001, a second AI apparatus 1002, and a third AI apparatus 1003 are registered. FIG. 11 illustrates image data ((a) in FIG. 11) and image data ((b) in FIG. 11), and image data ((c) in FIG. 11) respectively obtained by the first AI apparatus 1001, the second AI apparatus 1002, and the third AI apparatus 1003 that are registered in the AI system 1.

Referring to FIGS. 10 and 11, the image data ((a) in FIG. 11) obtained by the first AI apparatus 1001 includes the third AI apparatus 1003 and the user 1004, the image data ((b) in FIG. 11) obtained by the second AI apparatus 1002 includes the third AI apparatus 1003 and the user 1004, and the image data ((c) in FIG. 11) obtained by the third AI apparatus 1003 includes the second AI apparatus 1002 and the user 1004.

The first AI apparatus 1001 may recognize the user 1004 in the obtained image data ((a) in FIG. 11) and determine a direction of the recognized user 1004 with respect to the first AI apparatus 1001.

Here, the first AI apparatus 1001 may determine a relative direction between the recognized user 1004 and the third AI apparatus 1003 contained in the acquired image data ((a) in FIG. 11).

The second AI apparatus 1002 may recognize the user 1004 in the obtained image data ((b) in FIG. 11) and determine a direction of the recognized user 1004 with respect to the second AI apparatus 1002.

Here, the second AI apparatus 1002 may determine a relative direction between the recognized user 1004 and the third AI apparatus 1003 contained in the obtained image data ((b) in FIG. 11).

The third AI apparatus 1003 may recognize the user 1004 in the obtained image data ((c) in FIG. 11) and determine a direction of the recognized user 1004 with respect to the third AI apparatus 1003.

Here, the third AI apparatus 1003 may determine a relative direction between the recognized user 1004 and the second AI apparatus 1002 contained in the obtained image data ((c) in FIG. 11).

Since the AI apparatuses 1001, 1002, and 1003 constituting the AI system 1 identify the location information of the apparatuses 1001, 1002, and 1003, the apparatuses 1001, 1002, and 1003 may determine the location of the user by identifying the direction of the user 1004.

Figure 12:
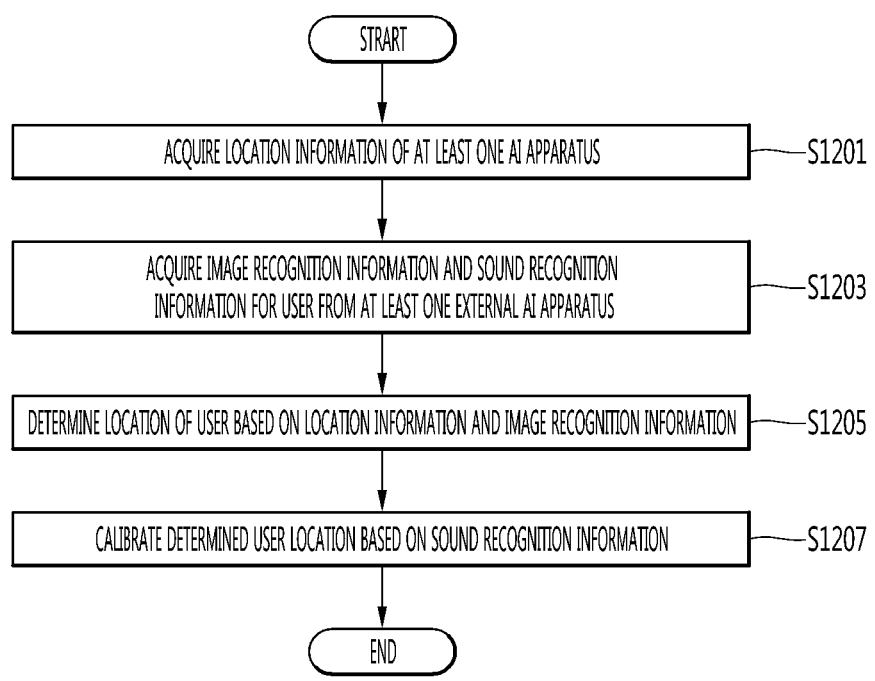
FIG. 12 is a flowchart illustrating a method for determining a location of a user in an artificial intelligence server 200 according to an embodiment of the present invention.

FIG. 12 is a flowchart illustrating a method for determining a location of a user in the artificial intelligence server 200 according to an embodiment of the present invention.

Specifically, FIG. 12 illustrates a method for determining a location of a user by the artificial intelligence server 200 in a state in which the artificial intelligence server 200 is included in the AI system 1.

The artificial intelligence server 200 may mean an apparatus that does not include the camera 121 and the microphone 122 as compared with the AI apparatus 100. Therefore, the artificial intelligence server 200 differs from the AI apparatus 100 in that the server 200 does not obtain the image data and the sound data. Thus, a description overlapping with FIG. 7 will be omitted.

Referring to FIG. 12, the processor 260 of the artificial intelligence server 200 acquires location information of the at least one AI apparatus 100 (S1201).

The AI apparatuses 100 constitute one AI system 1 together with the artificial intelligence server 200. Further, an apparatus registration process may be performed to constitute one AI system 1.

Here, when a new AI apparatus 100 is registered in the AI system 1, each of the AI apparatuses 100 and the artificial intelligence server 200 may acquire image data of the new AI apparatus 100 via the camera and may use the acquired image data to generate location information of the new AI apparatus 100.

Alternatively, the location information of the new AI apparatus 100 may be determined by user's input.

The generated location information may be shared among the AI apparatuses 100 and the artificial intelligence server 200.

Accordingly, the AI apparatus 100 identifies a relative location of another AI apparatus 100, which constitutes one AI system 1 together, or identifies an absolute location of said another AI apparatus 100 in the space.

Then, the processor 260 of the artificial intelligence server 200 acquires image recognition information and sound recognition information for the user from at least one external AI apparatus (S1203).

Then, the processor 260 of the artificial intelligence server 200 determines the location of the user based on the location information of the AI apparatuses 100 and the image recognition information of the user (S1205).

Then, the processor 260 of the artificial intelligence server 200 calibrates the determined user location based on the sound recognition information of the user (S1207).

Figure 13:
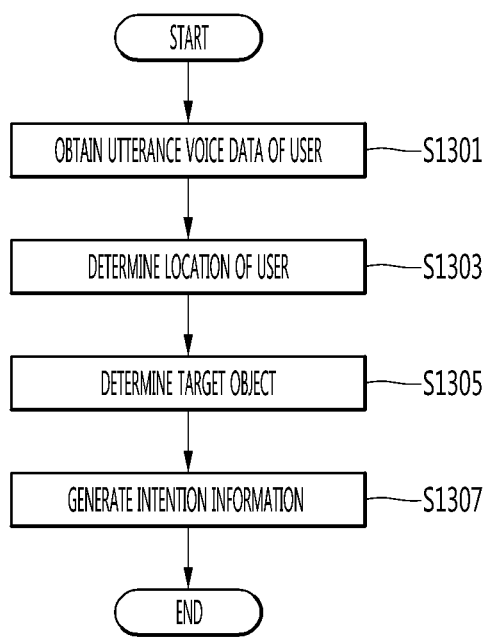
FIG. 13 is a flowchart illustrating a method for acquiring intention information of a user voice according to an embodiment of the present invention.

FIG. 13 is a flowchart illustrating a method for acquiring intention information of a user voice according to an embodiment of the present invention.

Referring to FIG. 13, the processor 180 of the AI apparatus 100 or the processor 260 of the artificial intelligence server 200 obtains utterance voice data of the user (S1301).

The utterance voice data of the user, which is data of a utterance voice for the user 300 to interact with the AI apparatus 100 or the intelligent server 200, may refer to a utterance voice for controlling a specific object, a utterance voice for querying, or the like.

Then, the processor 180 of the AI apparatus 100 or the processor 260 of the artificial intelligence server 200 determines the location of the user (S1303).

Here, the location of the user may be determined by the above-mentioned method for determining and calibrating the location of the user.

Here, the processor 180 of the AI apparatus 100 or the processor 260 of the artificial intelligence server 200 may obtain action information indicating an action of the user based on the image data obtained by each AI apparatus 100.

When the user performs an action of pointing a specific object or a specific direction, the action information may include the pointed object or the pointed direction.

Here, the processor 180 of the AI apparatus 100 or the processor 260 of the artificial intelligence server 200 may obtain gaze information indicating a gaze direction of the user based on the image data obtained by each AI apparatus 100.

Then, the processor 180 of the AI apparatus 100 or the processor 260 of the artificial intelligence server 200 determines a target object corresponding to the utterance voice data of the user (S1305).

The processor 180 of the AI apparatus 100 or the processor 260 of the artificial intelligence server 200 may determine the target object using at least one of the location, the action information, and the gaze information of the user.

The target object may refer to an object, a place, or the like that is a target of interaction or control corresponding to the utterance voice of the user.

Then, the processor 180 of the AI apparatus 100 or the processor 260 of the artificial intelligence server 200 generates intention information corresponding to the utterance voice data of the user (S1307).

Even when the user does not specify a target of interaction or control when giving an utterance, the intention information of the user may be generated using the determined target object as described above.

For example, when the user gives an utterance, such as 'Please, turn off the light here' in a bedroom, the processor 180 of the AI apparatus 100 or the processor 260 of the artificial intelligence server 200 may determine the target object as a lamp in the bedroom and generate intention information having content of turning off the lamp in the bedroom.

For example, when the user points to a specific location in the bedroom and give an utterance such as 'Please, clean up here.', the processor 180 of the AI apparatus 100 or the processor 260 of the artificial intelligence server 200 may determine the target object as an area pointed by the user in the bedroom and generate intention information having content of cleaning the area pointed by the user in the bedroom.

For example, when the user looks at a wall clock in the bedroom and gives an utterance such as 'I need to buy a new battery for that. Please, order it online.', the processor 180 of the AI apparatus 100 or the processor 260 of the artificial intelligence server 200 may determine the target object as the wall clock in the bedroom and generate intention information having content of ordering the battery suitable for the wall clock in the bedroom online.

Further, the processor 180 of the AI apparatus 100 or the processor 260 of the artificial intelligence server 200 may provide feedback on the utterance voice data of the user based on the location of the user.

The feedback may include at least one of visual feedback, auditory feedback, or tactile feedback.

Here, the visual feedback may include outputting an image or a text on the display or adjusting a brightness, a color, an intensity of illumination, or the like of lighting and outputting the visual feedback. Further, the auditory feedback may include a voice (a colloquial form of language) and a signal sound (melody/music), and the tactile feedback may include a vibration.

Here, the AI apparatus 100 near the user may provide the feedback.

When the AI apparatus 100 closest to the user may not be able to output a particular type of the feedback, the AI apparatus 100, which is capable of outputting the corresponding type of the feedback and is closest to the user, may provide the feedback, alternatively.

For example, when the user gives an utterance such as "Please, order the battery from a mart", information and price of the battery may be displayed on a screen of a TV currently being watched by the user or displayed on a nearby refrigerator display. When there is no nearby display, the information and price of the battery may be output by a mobile terminal.

Figure 14:
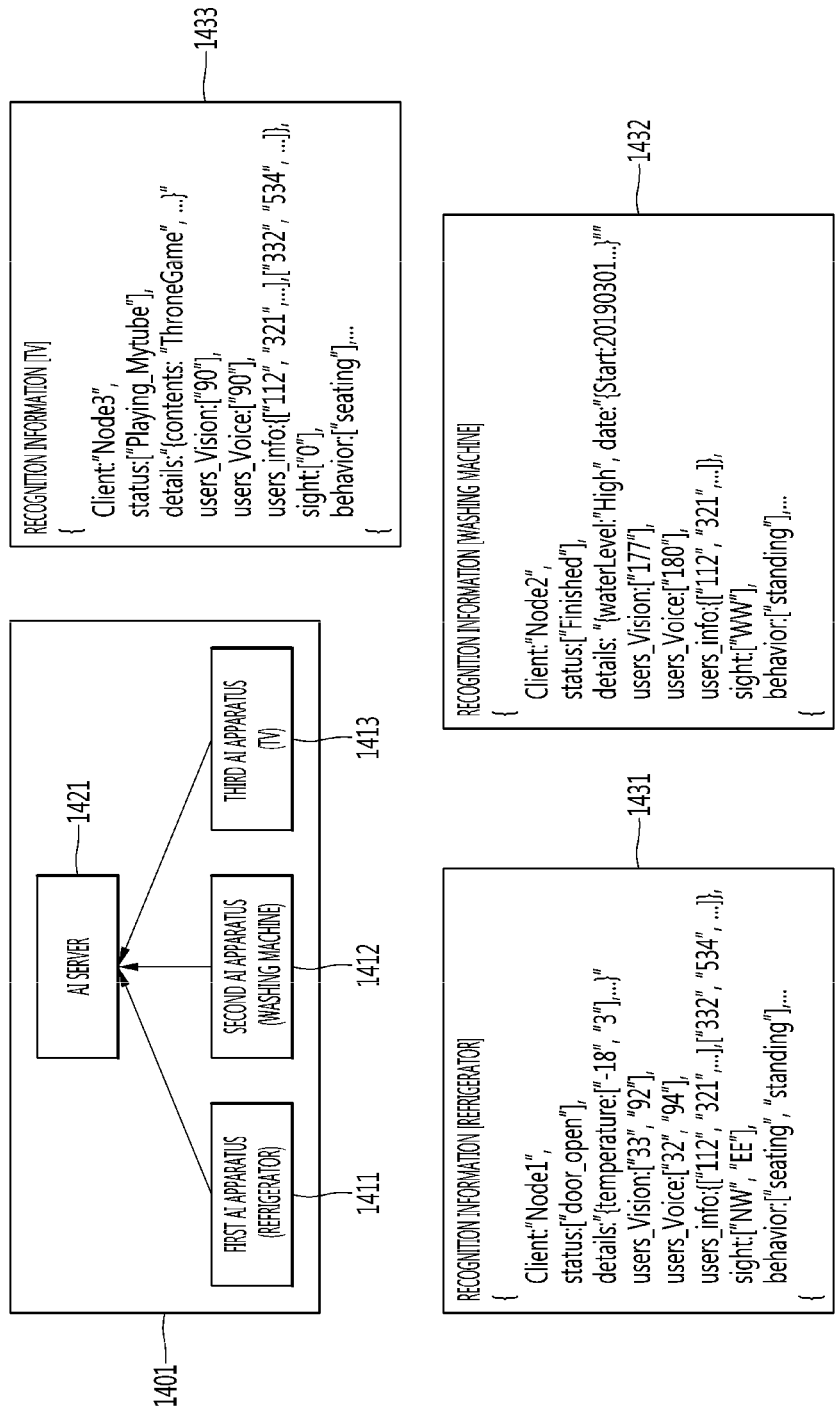
FIG. 14 is a view illustrating an example of recognition information collected from an AI apparatus 100 according to an embodiment of the present invention.

FIG. 14 is a view illustrating an example of recognition information collected from the AI apparatus 100 according to an embodiment of the present invention.

In the example illustrated in FIG. 14, an AI system 1401 includes three AI apparatuses 1411, 1412, and 1413 and one artificial intelligence server 1421. Here, a first AI apparatus 1411 is a refrigerator, a second AI apparatus 1412 is a washing machine, and a third AI apparatus 1413 is a TV.

The AI apparatuses 1411, 1412, and 1413 may respectively generate recognition information 1431, 1432, and 1433 for the user respectively using image data and sound data, and respectively transmit the generated recognition information 1431, 1432, and 1433 to other AI apparatuses or to the artificial intelligence server 1421.

Here, each of the recognition information may include recognition information generated based on the image data of the user and recognition information generated based on sound data.

The recognition information 1431, 1432, and 1433 may respectively include 'status' respectively indicating statuses of nodes or the AI apparatuses 1411, 1412, and 1413. The state of the apparatus may be interpreted differently depending on a domain of the apparatus. The artificial intelligence server 1421 may obtain domain detailed information for each apparatus when registering the product.

Further, each of the recognition information 1431, 1432, and 1433 may include 'details' indicating details of the apparatus status. For example, when a 'date' in a domain of the TV 1433 indicates a start time of content or a time when the TV is turned on, a 'date' in the washing machine may be a time when washing is started.

Further, each of the recognition information 1431, 1432, and 1433 may include 'users_vision' indicating a direction of the user recognized via the camera and 'users_voice' indicating a direction of the user recognized via the microphone.

Further, each of the recognition information 1431, 1432, and 1433 may include 'user_info' indicating a feature for each user for specifying the user. The feature of the user may be an extracted facial landmark or may mean a physical landmark.

Further, each of the recognition information 1431, 1432, 1433 may include 'sight' indicating a direction of gaze of the user when viewed from a perspective of the apparatus. The gaze direction may be expressed in various levels of the camera. The gaze direction may be expressed in a range of 0 to 360 degrees, or expressed in cardinal points north, south, east, and west.

Further, each of the recognition information 1321, 1432, and 1433 may include 'behavior' indicating an action of each user. The user's action may include seating, standing, walking, lying, pointing, and the like.

In items related to the user in the recognition information 1431, 1432, and 1433, data may be collected for each user when a plurality of users are recognized.

The artificial intelligence server 1421 may determine the location of the user using the recognition information 1431, 1432, and 1433 respectively received from the AI apparatuses 1411, 1412, and 1413.

The recognition information 1431, 1432, and 1433 respectively received from the AI apparatuses 1411, 1412, and 1413 may be processed in the artificial intelligence server 1421 and expressed in global coordinates, respectively.

Because there are the plurality of users, the AI server 1421 may assign an ID for each user and may determine a behavior and a location for each user.

In this way, each of the AI apparatuses 1411, 1412, and 1413 or the artificial intelligence server 1421 may determine the location of the user and provide a user-customized service.

For example, a user watching the TV in a living room looks at a wall clock and gives an utterance, such as "I need to change a battery for that. Please, order it online.", the artificial intelligence server 200 may use the collected recognition information to determine that the "that" is the wall clock in a gaze direction of the user and order the battery of a right size for the wall clock online.

FIG. 14 is an example of the AI system 1401 in which the artificial intelligence server 1421 acquires the recognition information respectively from the AI apparatuses 1411, 1412, and 1413 to determine the user location, and the present invention is not limited thereto.

That is, in FIG. 14, the AI server 1421 may be replaced by an AI apparatus.

Figure 15:
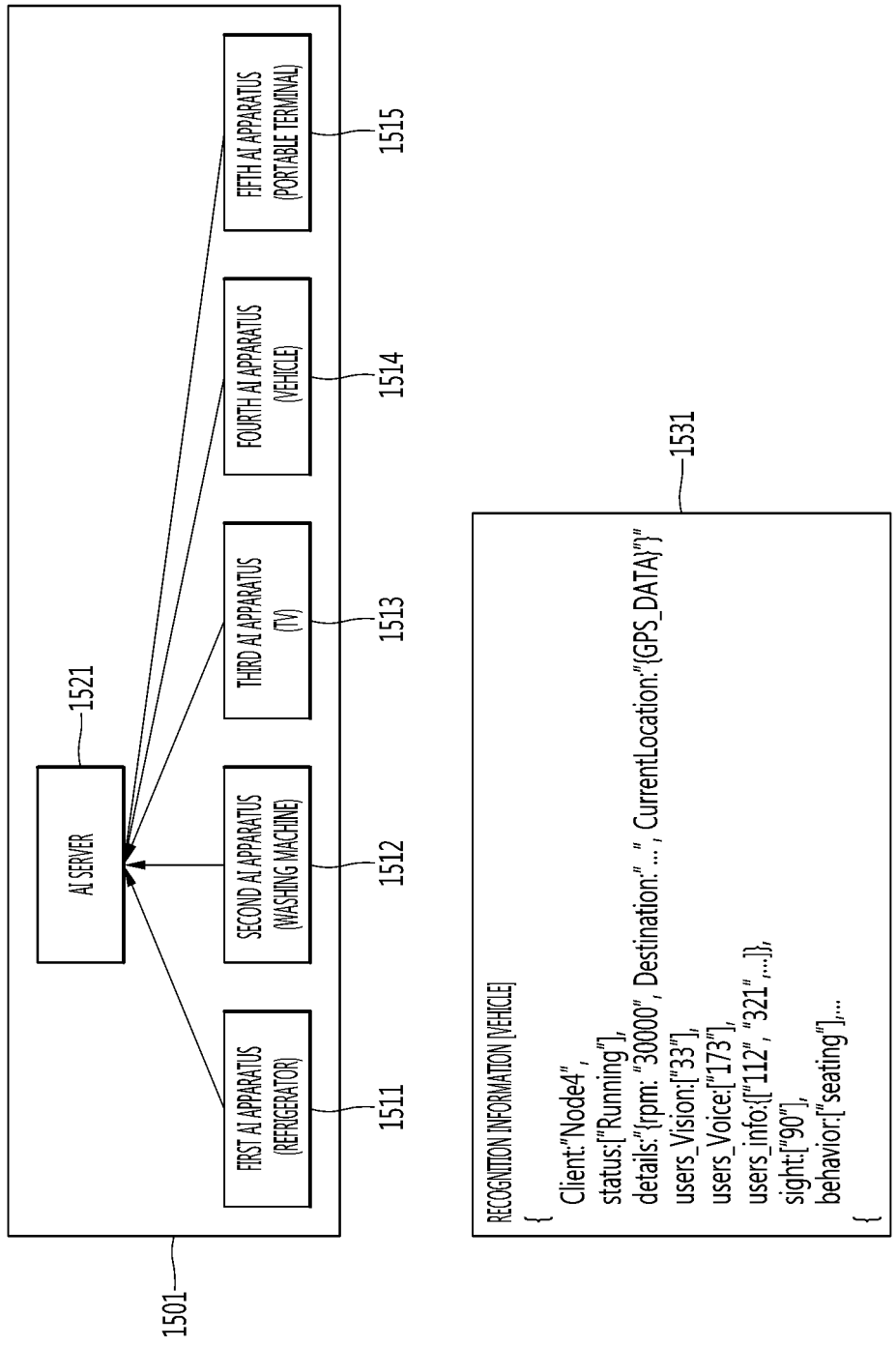
FIG. 15 is a view illustrating an example of recognition information collected by an AI apparatus 100 according to an embodiment of the present invention.

FIG. 15 is a view illustrating an example of recognition information collected by the AI apparatus 100 according to an embodiment of the present invention.

In the example illustrated in FIG. 15, an AI system 1501 includes three AI apparatuses 1511, 1512, and 1513 installed indoors, two external AI apparatuses 1514 and 1515, and one artificial intelligence server 1521. Here, a first AI apparatus 1511 is a refrigerator, a second AI apparatus 1512 is a washing machine, a third AI apparatus 1413 is a TV, a fourth AI apparatus 1514 is a vehicle, and a fifth AI apparatus 1515 is a portable terminal.

Even when the user is at home, when GPS information may be obtained such as in a case of the vehicle 1514 or the portable terminal 1515, the vehicle 1514 or the portable terminal 1515 may transmit a set destination and GPS data to the AI server 1521 to predict the location of the user, thereby providing a service.

For example, when the destination of the vehicle 1514 is set to home and is currently winter, the artificial intelligence server 1521 may control a boiler to be turned on in advance. Here, the boiler may be controlled so as not to simply heat a whole house, but heat in accordance with a movement path of a specific user (or a room thereof).

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence (AI) apparatus for determining a location of a user, the AI apparatus comprising:
   a communication unit configured to communicate with at least one external AI apparatus obtaining first image data and first sound data;
   a memory configured to store location information on the at least one external AI apparatus and the AI apparatus;
   a camera configured to obtain second image data;
   a microphone configured to obtain second sound data; and
   a processor configured to:
   generate first recognition information on the user based on the second image data;
   generate second recognition information on the user based on the second sound data;

obtain, from the at least one external AI apparatus, third recognition information on the user generated based on the first image data and fourth recognition information on the user generated based on the first sound data;

determine the user's location based on the location information, the first recognition information, and the third recognition information; and calibrate the determined user's location based on the second recognition information and the fourth recognition information.

2. The AI apparatus of claim 1, wherein the location information includes distance information from the AI apparatus to the at least one external AI apparatus and camera direction information of the at least one external AI apparatus, wherein each of the first recognition information to the fourth recognition information includes direction information of the user with respect to the corresponding AI apparatus or at least one external AI apparatus, wherein the processor is configured to determine and calibrate the location of the user based on the distance information, the camera direction information, and the direction information of the user.

3. The AI apparatus of claim 2, wherein the location information is set by input of the user or determined based on image recognition information generated based on the first image data and the second image data when the AI apparatus or the at least one external AI apparatus is installed.

4. The AI apparatus of claim 3, wherein the location information includes locations in map data corresponding to installation spaces of the at least one external AI apparatus and the AI apparatus, respectively, and wherein the determined user location includes a location of the user in the map data.

5. The AI apparatus of claim 1, the processor is configured to:

assign higher priorities to the recognition information respectively acquired from fixed AI apparatuses that has not moved for a predetermined time among the AI apparatus and the at least one external AI apparatus than recognition information respectively acquired from non-fixed AI apparatuses; and determine the location of the user in consideration of the priorities for the recognition information.

6. The AI apparatus of claim 1, wherein the processor is configured to:

determine the location of the user when utterance voice data is acquired from the user; and determine a target object corresponding to the utterance voice data using the determined location of the user.

7. The AI apparatus of claim 6, wherein the processor is configured to:

acquire action information of the user based on the second image data; and determine the target object corresponding to the utterance voice data using the action information.

8. The AI apparatus of claim 6, wherein the processor is configured to:

acquire gaze information of the user based on the second image data; and determine the target object corresponding to the utterance voice data using the gaze information.

9. The AI apparatus of claim 1, wherein the processor is configured to generate the first recognition information or the second recognition information using a user recognition model learned by using a machine learning algorithm or a deep learning algorithm.

10. A method for determining a location of a user using an artificial intelligence (AI) apparatus, the method comprising:

obtaining location information of at least one external AI apparatus obtaining first image data and first sound data and the AI apparatus;

obtaining second image data;

obtaining second sound data;

generating first recognition information on the user based on the second image data;

generating second recognition information on the user based on the second sound data;

obtaining, from the at least one external AI apparatus, third recognition information on the user generated based on the first image data and fourth recognition information on the user generated based on the first sound data;

determining the user's location based on the location information, the first recognition information, and the third recognition information; and calibrating the determined user's location based on the second recognition information and the fourth recognition information.

11. A non-transitory computer readable storage medium having recorded thereon a computer program for controlling at least one processor of an artificial intelligence (AI) apparatus to perform a method for determining a location of a user, the method including:

obtaining location information of at least one external AI apparatus obtaining first image data and first sound data and the AI apparatus;

obtaining second image data;

obtaining second sound data;

generating first recognition information on the user based on the second image data;

generating second recognition information on the user based on the second sound data;

obtaining, from the at least one external AI apparatus, third recognition information on the user generated based on the first image data and fourth recognition information on the user generated based on the first sound data;

determining the user's location based on the location information, the first recognition information, and the third recognition information; and calibrating the determined user's location based on the second recognition information and the fourth recognition information.

* * * * *